UNITED STATES PATENT OFFICE.

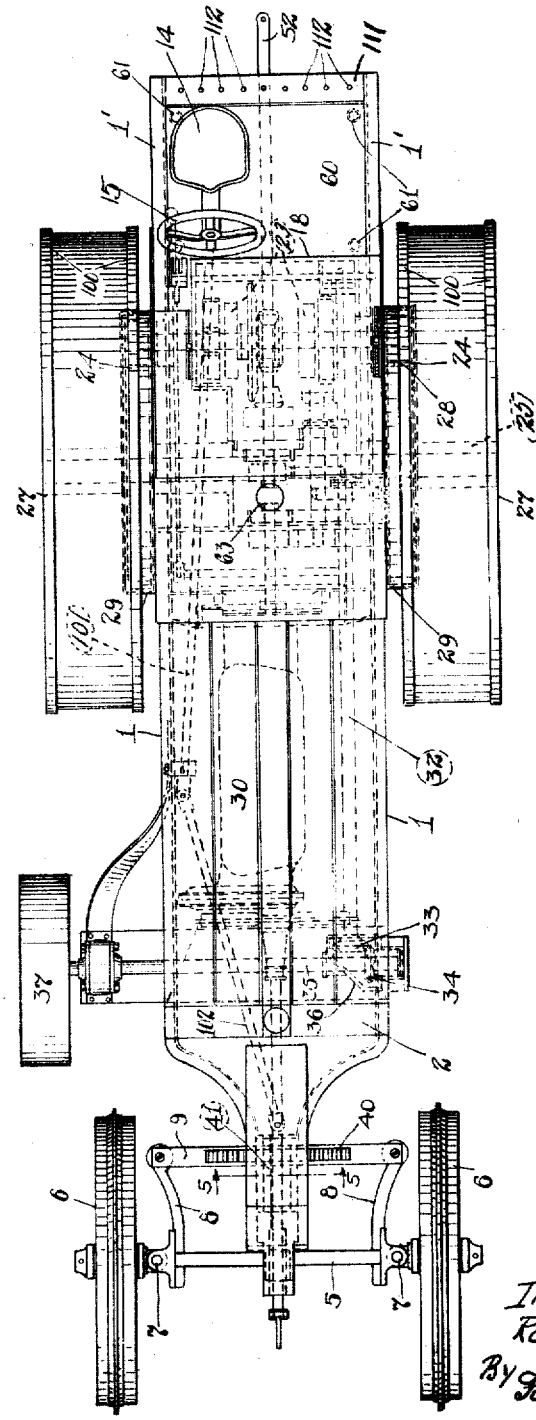

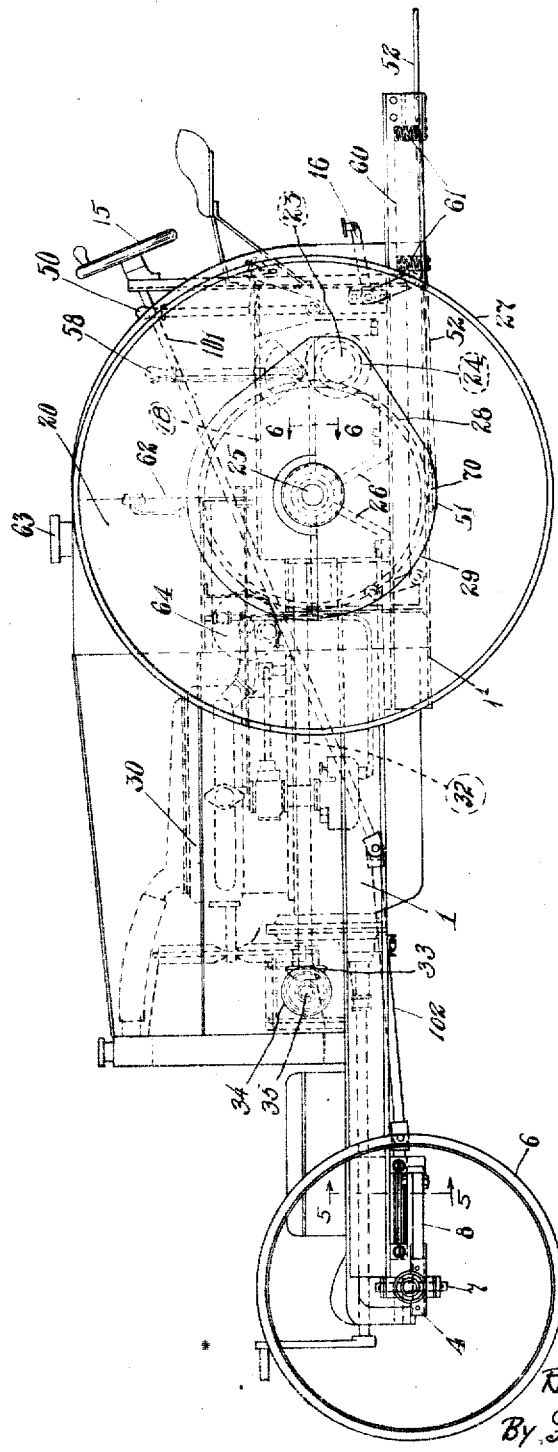

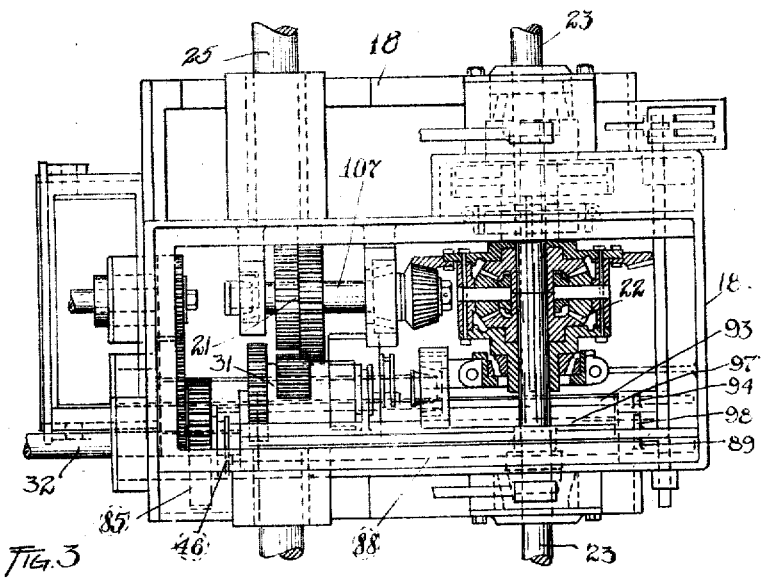
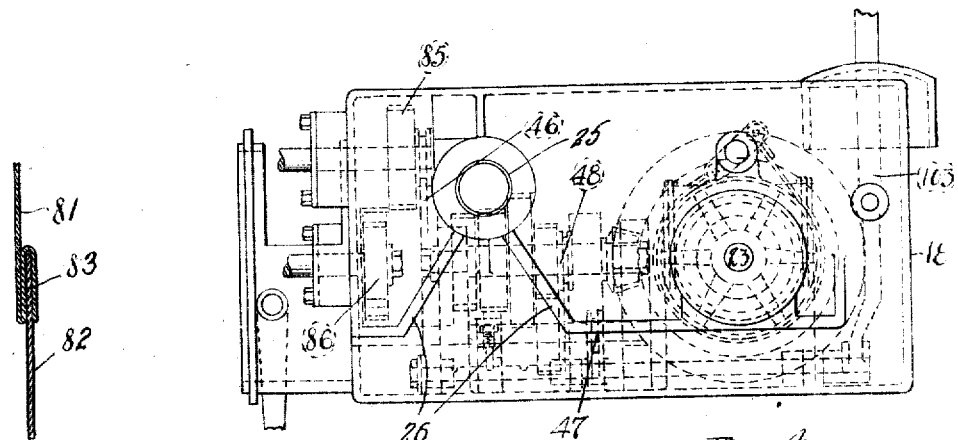
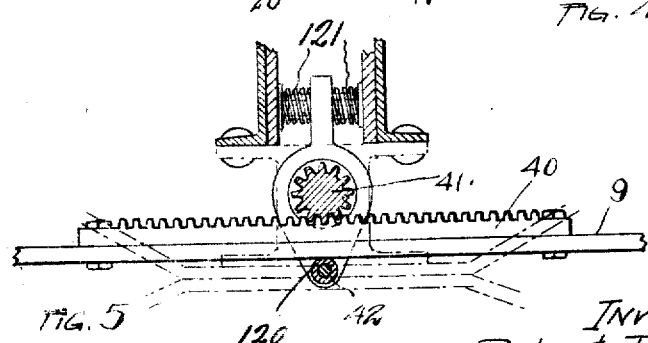

ROBERT T. EVANS, OF HUDSON, OHIO, ASSIGNOR TO THE EVANS MANUFACTURING COMPANY, OF HUDSON, OHIO, A CORPORATION OF OHIO.

TRACTOR.

1,318,490.

Specification of Letters Patent.

Patented Oct. 14, 1919.

Application filed January 18, 1918. Serial No. 212,405.

*To all whom it may concern:*

Be it known that I, ROBERT T. EVANS, a citizen of the United States, and a resident of Hudson, county of Summit, and State of Ohio, have invented a new and useful Improvement in Tractors, of which the following is a specification, the principle of the invention being herein explained and the best mode in which I have contemplated applying that principle, so as to distinguish it from other inventions.

The present improvements, relating, as indicated, to tractors, are more particularly directed to the provision in such a machine of units which may be independently and separately constructed and then conveniently assembled in the complete tractor. Other objects of the invention are so to arrange the draw-bar connections as to oppose the torque of the driving connections to the traction wheels reacting on the frame and thereby secure an increased traction effect, and to provide improved steering mechanism, which is constructed to leave the wheels free to follow the oscillation of the frame without affecting the angularity of the machine. Still other objects of the invention are an improved mounting and driving means for a power pulley and an improved construction of driving means for the traction wheels. To the accomplishment of the foregoing and related ends, said invention, then consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1 is a plan view of my improved machine; Fig. 2 is a side elevation of the same; Fig. 3 is a side view of the transmission case with cover removed; Fig. 4 is a side elevation showing the transmission case; Fig. 5 is a section on the line 5—5, Fig. 2; and Fig. 6 is a section on the line 6—6, Fig. 2.

The construction of the machine can be readily seen from Figs. 1 and 2. There is a frame consisting of suitable U or I-shaped members 1, which, for the greater part of their length, are disposed parallel and are connected to suitable transverse members 2, these parallel longitudinal frame members being curved inwardly at their forward ends to provide a support for a member 4 in which is pivotally mounted, to swing about a horizontal axis, the front axle 5. The front axle 5, which is a load-bearing axle and not a driving axle, is preferably an I-beam and is provided on either end with spindles upon which are mounted the forward wheels 6. It will be noted that a relatively short turning radius is insured by the curving of the frame members inwardly away from the wheels. The spindles 7 are pivotally attached to the axle about vertical axes and their pivotal movement is controlled by means of short levers 8 extending rearwardly from the spindles and maintained in alinement by means of a transverse bar 9. On this transverse bar 9 is mounted a rack 40, which is engaged with a horizontally disposed longitudinal pinion 41. The pinion is mounted in alinement with the axis about which the front axle 5 is pivoted, so that oscillation of the front axle will not cause any movement of the rack with respect to the pinion except a turning of the former about the latter, which will of course not move the levers 8 nor change the angularity of the wheel spindles. Turning of the levers 8 will cause a slight forward and back movement of the rack 40, and to prevent any possibility of disengagement between the rack and the pinion caused by this longitudinal movement, the pinion is made considerably wider than the rack, as indicated, so that there is at all times complete engagement between the two. In Fig. 5 there is shown a section through the rack 40 and pinion 41, and in this section there is shown a supporting roller 42, which is normally in contact with the lower side of the rack 40, and which serves to maintain the engagement between the rack and pinion. This is an important and essential feature of such a steering mechanism, since when the machine is backed the rack would otherwise pull out of engagement with the pinion 41 and it would be impossible to steer the machine.

The frame members 1 extend rearwardly to a point slightly forward of the rear axle, where they are rigidly connected to other members 1' constituting in effect extensions of such first named members, but lying below the same so as to give a drop effect to the frame at the rear. These members 1' form a support for a casing 18 that incloses the transmission 21 and differential 22, such casing rigidly connecting the members. Casing 18 also forms a support not only for the operator's seat 14, but for a controlling pedal 16 and operating levers 50 and 58. Mounted upon the side members 1, i. e. the forward portion of the general frame, and so in front of the casing 18, is a motor 30 that is rigidly attached to said side members, as also to such casing. Over the forward upper portion of the casing 18, or in other words directly to the rear of the engine, is located a fuel tank 20.

The transmission 21 is of the usual selective type, and the differential mechanism 22 is likewise of familiar construction in general, the respective driving shafts 23 that are connected with such differential extending through the sides of the casing 18 beyond the corresponding frame members 1', and being provided with pinions 24 at their outer ends. The traction wheels 27 are rotatably mounted on the respective outer ends of the rear axle 25 which passes through and supports the casing 18 and thereby the rear portion of the frame, the sides of the casing being strengthened by ribs 26, since the major portion of the load is supported, through such casing, upon the traction wheels. On the axle 25 are large gears 28 which may be mounted upon the hubs of the traction wheels, or may be supported on ball bearings on the axle itself and connected to said wheels by suitable jaw clutches (not shown), as will be readily understood. These gears are engaged and driven by the pinions 24, both the gears and pinions being inclosed in a light casing 29 of suitable shape, the detail construction of which will be described later.

Vertically beneath the axle 25 is a transverse member 70 attached to the rear and lower frame members, which is provided with an extension 51, to which a draw bar 52 may be connected for pulling plows or other tools. By dropping the rear portion of the frame as previously described, with such rear portion at a lower elevation than the forward section, it is possible to position the transverse member for receiving the draw bar a considerable distance beneath the axles, and upon a substantially horizontal plane with the point of attachment of the draw bar to the tools. This insures a straight horizontal pull upon the tools themselves. The attachment of the draw-bar at this point will of course tend to pull down or impress an additional load upon the front or steering wheels, which is objectionable as tending to cause the machine to nose into the ground, as well as losing that much tractive effort. This tendency, however, I have overcome by the particular disposition of the driving shafts 23, which it will be observed (see Fig. 2) lie to the rear and substantially in the same plane as the axle 25 on which the traction wheels 27 are mounted. The shafts 23, with their pinions 24, rotate in a clockwise direction when the tractor is advancing, and so the driving torque of the pinions on the large gears 28 will tend to lift the forward end of the frame and correspondingly decrease the load on the steering wheels. This effect may be gaged to approximately counter-balance the opposite tendency of the pull on the draw-bar, as will be readily understood. The members 1', which constitute the rear portion of the frame, support an operator's platform 60 by means of springs 61, upon which the operator may stand, or from which he may ascend to the seat 14. Disposed forwardly of the controlling levers and steering mechanism is the compartment 20, provided with a filling cap 63, which constitutes the fuel supply chamber, and directly beneath this chamber is mounted a muffler 64 for the engine. The heat of the exhaust passing through the muffler is sufficient to raise the temperature of the fuel which assists in starting the motor after it has stood in the cold for some time. On the rear side of the tank 20 is provided an instrument board 62, upon which the various indicating instruments which are necessary, such as the oil gage, fuel gage, and the controlling switches, may be mounted, as in the usual motor vehicle.

In the manufacture of the tractor, after the frame members have been assembled, the motor 30 and the casing 18 containing the transmission and differential are placed thereon and rigidly secured thereto as well as to each other. The frame members and such motor and casing thus form a unitary structure of rigid and substantial character, insuring the maintenance of proper alinement between the various shafts and gears in said transmission and differential.

The transmission gearing in the casing 18 includes a longitudinally disposed jack shaft 31 from which is driven a second longitudinally disposed shaft 32 that extends from said casing 18 to the forward end of the frame where it is provided with a beveled gear 33 engaging a corresponding beveled gear 34 attached to a transversely disposed shaft 35.

The shaft 32 is driven by a gear 85 thereon, which is shiftable into mesh with the driving gear 86 on the engine shaft by means of the yoke 46 on rod 88. This rod in turn has a projecting lug 89, which may be engaged by a yoke on the lower end of the shifting lever 103 for the transmission gears in the casing 18. These gears and the collar 47 and 48 are operated by rods 93 and 94, which bear lugs 97 and 98 similar to the lug 89 on the rod 88. The yoke on the shifting lever must be used to engage any of these gears and hence the power pulley gear 85 cannot be used unless the tractor driving gears are first thrown out of mesh. This prevents accidents and simplifies the control of the machine.

The beveled gears 33 and 34 are inclosed in a suitable oil-tight casing 36, Fig. 1, and the shaft 35 is journaled in the frame members 1 and extends beyond the same on the right hand side, where a pulley 37 is attached. The shaft 35 is disposed at an exact right angle to the center line of the tractor, and the pulley 37 is therefore parallel with the center line of the entire machine, which makes it an easy matter for the operator to aline the pulley with the pulley on a machine which is to be operated therefrom, since it is only necessary for him to line up the tractor as a whole with such driven pulley. This is a matter of considerable importance since it is very difficult with the ordinary tractor to secure an exact alinement between the power pulley, which is ordinarily mounted either transversely of the frame or longitudinally of the frame behind the driver, and the pulley on a machine which is to be driven. Furthermore, in the mounting of the power pulley at the forward end of the machine, where it is at a considerable distance from the rear wheel and is outside of the front wheels, it is possible to use a relatively large pulley which may be run at a relatively slow speed, rather than a small pulley running at a high speed as is usually necessary in tractors owing to the position in which the pulley must be mounted.

In the drawings I have shown other elements of the construction which it is, however, unnecessary to describe in detail since they represent the usual type of construction in general use. Adjacent to the operator's seat 14 is mounted a steering wheel 15 on a shaft 101, which is connected by means of a universal joint to a second shaft 102 extending to and being connected by means of a second universal joint to the pinion 41. Also the transmission gears are controlled by sliding them on the jackshaft 31 by means of a pivoted lever 103 operating shifting collars 46, 47 and 48 on the shafts of said transmission. The gears on said shafts for driving the propeller shaft 107 and the pulley driving shaft 32 are so disposed that they may be thrown into the desired engagement by the movement of this shifting lever.

The features of particular importance in my tractor are the construction and disposition of the motor and casing for the gearing in connection with the frame and rear axle, since they make it possible to manufacture the machine in separate and independent units which may then be conveniently and securely assembled into an extremely compact and rigid tractor. Additional features are the inclosure 29 for the final drive for the tractor wheels and the mounting and drive for the power pulley. In Fig. 6 there is shown a section through such casing inclosing the driving gears for the traction wheels, showing that this casing consists of two semi-circular members fitting together along a horizontal line for the greater portion of their engagement, but curving around at the center where the driving shaft fits into the casing. The upper and lower sections 81 and 82 of this casing engage each other by means of a U-shaped recess 83, formed in the upper of the two sections and engaging over the edge of the lower section. The engagement between these upper and lower sections is a snug one so that oil placed in the casing will not work its way out at this point. In this way adequate lubrication for the driving gear and the driven gear on the wheel may be had, while both these gears are securely protected from the mud and dirt, which would otherwise affect their operation and their life.

It will be noted that the casing 18 carries both the transmission gears and differential driving mechanism. These two mechanisms are very compactly arranged in this casing, the transmission gears even overlapping the differential longitudinally of the machine. The weight of this casing and contained mechanism is considerable, and, in fact, is as much or more than the weight of the motor, so that by disposing said casing mainly behind the rear axle, as shown, the weight of the engine is balanced on such axle to a greater degree than ordinarily, thereby correspondingly relieving the load on the steering wheels. In other words, owing to such disposition of parts, and the compactness and short length of the differential and transmission mechanism in casing 18, I have been able to secure a weight distribution of about five-sixths on the rear wheels and one-sixth on the front wheels.

On each of the rear wheels are mounted two steel bands 100 which are shrunk tightly into place along the outer and inner edges and allow the machine to be run on hard pavements without the severe jarring that is found if broad flat tires are used, as these bands raise the wheel surface proper above small obstructions. On soft surfaces these bands increase the grip and prevent side slip.

At the rear of the frame is a transverse bar 111 provided with a series of holes 112 therein. In case it is desired to pull from one corner or side of the tractor, the draw bar can be moved into the desired position and a bolt dropped into the nearest hole to hold the draw bar in the desired position.

It will be seen from Fig. 5 that the supporting roller for maintaining the rack in mesh with the teeth of the steering pinion is mounted in a bracket 120, which is pivotally supported and has its upper end disposed between two coil springs 121. By this mounting of the bracket, the roller is allowed to swing slightly to one side or the other in agreement with the tilting of the front axle and of the rack attached to the wheels.

The location of the gears for driving the gears attached to the wheels is of importance in connection with the distribution of weight in the tractor, since there is a tendency, of course, for the small driving gears to ride down behind the large driven gears and to thus tilt up the forward end of the tractor. This tendency is, of course, assisted by the large amount of weight on the rear axle and the very small amount of weight on the front axle. Since the point of application of the resistance of any tools which are being pulled is below the rear axle, this resistance tends to offset the tendency of the front end of the tractor to be raised, and, hence, this location of the draw bar is of considerable importance in connection with the construction of the driving means in my device.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a tractor, the combination with a main frame comprising suitably connected side members, the forward ends of said members being bent inwardly toward each other and the rear portions thereof being dropped below the front portions, of an engine rigidly mounted on such front frame portion, and a casing similarly rigidly mounted on such dropped rear portion and containing the transmission and differential, said engine and casing being rigidly connected together.

2. In a tractor, the combination with a main frame comprising suitably connected side members, the rear portions of said members being dropped below the front portions, of an engine rigidly attached to such front frame portions, a casing similarly rigidly mounted on such dropped rear portion and containing the transmission and differential, said engine and casing being rigidly connected together, traction wheels, and an axle for the latter passing through and supporting said casing and thereby the rear portion of said frame.

3. In a tractor, the combination with a main frame comprising suitably connected side members, of an engine, a casing to the rear thereof containing the transmission and differential, steering wheels supporting the front end of said frame, traction wheels, an axle for the latter passing through and supporting said casing and thereby the rear portion of said frame, a draw-bar attached to said frame substantially directly beneath said axle, and driving connections between said differential and traction wheels located to the rear of said axle.

4. In a tractor, the combination with a main frame comprising suitably connected side members, the rear portions of said members being dropped below the front portions, of an engine rigidly mounted on the front frame portion, a casing similarly rigidly mounted on such dropped rear portion and containing the transmission and differential, said engine and casing being rigidly connected together, traction wheels, an axle for the latter passing through and supporting said casing and thereby the rear portion of said frame, a draw-bar attached to said frame substantially directly beneath said axle, gears attached to said wheels, and driving pinions for said gears connected with said differential and located to the rear of said axle.

5. In a tractor, the combination of a suitable frame, traction wheels supporting said frame, an engine mounted on said frame, a change speed gearing and differential for connecting said engine and wheels, a power pulley, and means forming part of said change speed gearing adapted alternatively to connect said engine with said power pulley or wheels.

6. In a tractor, the combination of a suitable frame, traction wheels supporting said frame, an engine mounted on said frame with its shaft extending longitudinally of said frame, a change speed gearing and differential for connecting said engine and wheels, a transversely disposed power shaft and a pulley mounted thereon, and means forming part of said change speed gearing adapted alternatively to connect said engine with said transversely disposed shaft or wheels.

7. In a tractor, the combination of a suitable frame, traction wheels supporting said frame, an engine mounted on said frame, a transmission and differential for connecting said engine and wheels, a transversely disposed shaft and power pulley carried thereby, another shaft parallel with the engine shaft connected at its one end to drive said power-pulley shaft, and means adapted alternatively to connect said engine with the other end of said parallel shaft or with said transmission.

8. In a tractor, the combination with a main frame, the rear portions of said side members being dropped below the front portions, of traction wheels supporting said frame, an engine rigidly mounted on the front-frame portion with its shaft extending longitudinally of the frame, a casing rigidly mounted on such dropped rear portion and containing the transmission and differential, a transversely disposed shaft journaled in said frame forwardly of said engine, a power pulley carried thereby, another shaft parallel with the engine shaft connected at its front end to drive said power-pulley shaft, and means adapted alternatively to connect said engine with the rear end of said parallel shaft or with said transmission.

Signed by me, this 14th day of Jan. 1918.

ROBERT T. EVANS.